United States Patent
Lee et al.

(10) Patent No.: US 10,338,298 B2
(45) Date of Patent: Jul. 2, 2019

(54) BACKLIGHT UNIT AND DISPLAY DEVICE COMPRISING THE SAME

(71) Applicant: SAMSUNG ELECTRONICS CO., LTD., Suwon-si (KR)

(72) Inventors: Jinho Lee, Suwon-si (KR); Yoonsun Choi, Yongin-si (KR); Dong Kyung Nam, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/678,524

(22) Filed: Aug. 16, 2017

(65) Prior Publication Data
US 2018/0149795 A1    May 31, 2018

(30) Foreign Application Priority Data
Nov. 28, 2016 (KR) .................. 10-2016-0159378

(51) Int. Cl.
*F21V 8/00* (2006.01)
*G02B 27/22* (2018.01)

(52) U.S. Cl.
CPC ......... *G02B 6/0038* (2013.01); *G02B 6/0028* (2013.01); *G02B 6/0031* (2013.01); *G02B 6/0051* (2013.01); *G02B 6/0055* (2013.01); *G02B 6/0063* (2013.01); *G02B 6/0068* (2013.01); *G02B 6/0091* (2013.01); *G02B 27/22* (2013.01); *G02B 27/2214* (2013.01)

(58) Field of Classification Search
CPC ..... G02B 6/0038; G02B 6/0063; G02B 27/22
See application file for complete search history.

(56) References Cited

U.S. PATENT DOCUMENTS

| | | |
|---|---|---|
| 7,876,397 B2 | 1/2011 | Krijn et al. |
| 8,820,997 B2 | 9/2014 | Minami |
| 9,261,641 B2 | 2/2016 | Sykora et al. |

(Continued)

FOREIGN PATENT DOCUMENTS

| | | |
|---|---|---|
| CN | 103592771 A | 2/2014 |
| EP | 3023690 A1 | 5/2016 |

(Continued)

OTHER PUBLICATIONS

Minami et al., "34.5L: Late-News Paper: Glasses-Free 2D/3D Switchable Display Using a Unique Light Guide", SID Symposium Digest, Jun. 2011, 4 pages total.

(Continued)

*Primary Examiner* — Evan P Dzierzynski
(74) *Attorney, Agent, or Firm* — Sughrue Mion, PLLC

(57) ABSTRACT

A backlight unit, a display device including the backlight unit, and a method of manufacturing the backlight unit are provided. The backlight unit may include a light guide plate configured to provide light for a two-dimensional (2D) image and light for a three-dimensional (3D) image to a display panel, and the light guide plate may include a first output pattern formed on an upper surface of the light guide plate and configured to output the first light provided from the first light source to a display panel and a second output pattern formed on a lower surface of the light guide plate and configured to output the second light provided from the second light source to the display panel.

35 Claims, 11 Drawing Sheets

(56) References Cited

U.S. PATENT DOCUMENTS

| | | | | |
|---|---|---|---|---|
| 2002/0196617 | A1* | 12/2002 | Huang | G01D 11/28 362/23.1 |
| 2006/0104093 | A1* | 5/2006 | Feng | G02B 6/0016 362/626 |
| 2007/0223247 | A1* | 9/2007 | Lee | G02B 5/045 362/606 |
| 2012/0008067 | A1* | 1/2012 | Mun | G02B 6/003 349/65 |
| 2014/0043856 | A1* | 2/2014 | Thompson | F21V 3/049 362/613 |
| 2014/0300710 | A1 | 10/2014 | Shinoda et al. | |
| 2014/0375707 | A1* | 12/2014 | Wu | G02B 27/2228 345/697 |
| 2016/0202594 | A1 | 7/2016 | Kim et al. | |
| 2016/0216433 | A1 | 7/2016 | Lee et al. | |
| 2017/0192152 | A1 | 7/2017 | Choi et al. | |

FOREIGN PATENT DOCUMENTS

| | | |
|---|---|---|
| JP | 5589674 B2 | 9/2014 |
| JP | 5674023 B2 | 2/2015 |
| KR | 10-2012-0045868 A | 5/2012 |
| KR | 10-2015-0092653 A | 8/2015 |
| KR | 10-2016-0030830 A | 3/2016 |
| WO | 2008032775 A1 | 3/2008 |

OTHER PUBLICATIONS

Communication dated Apr. 19, 2018, from the European Patent Office in counterpart European Application No. 17203754.1.

* cited by examiner

FIG. 10
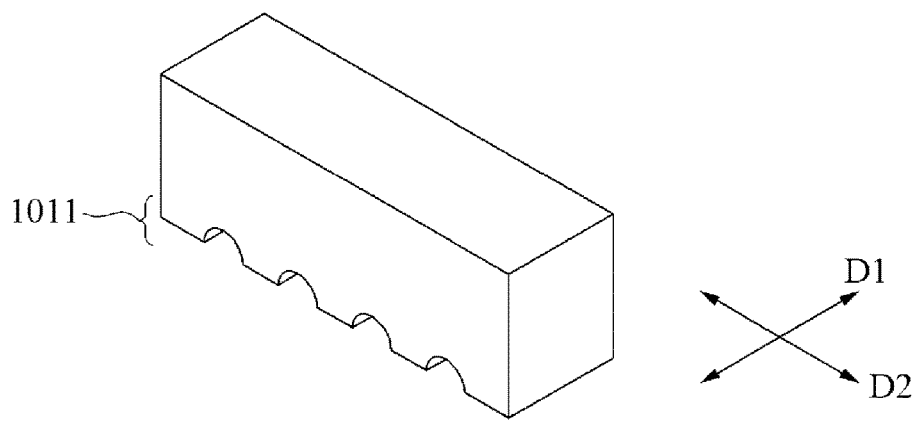
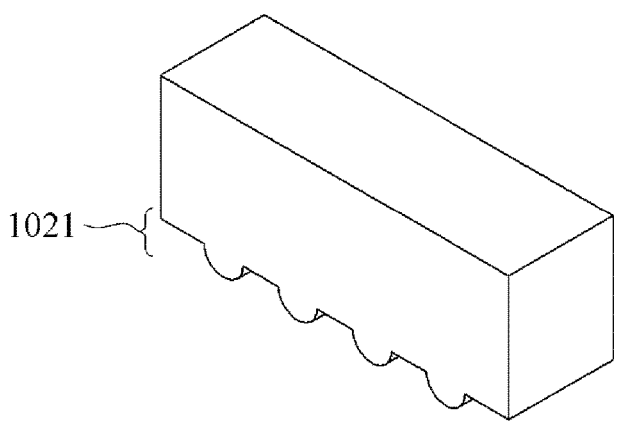

FIG. 12
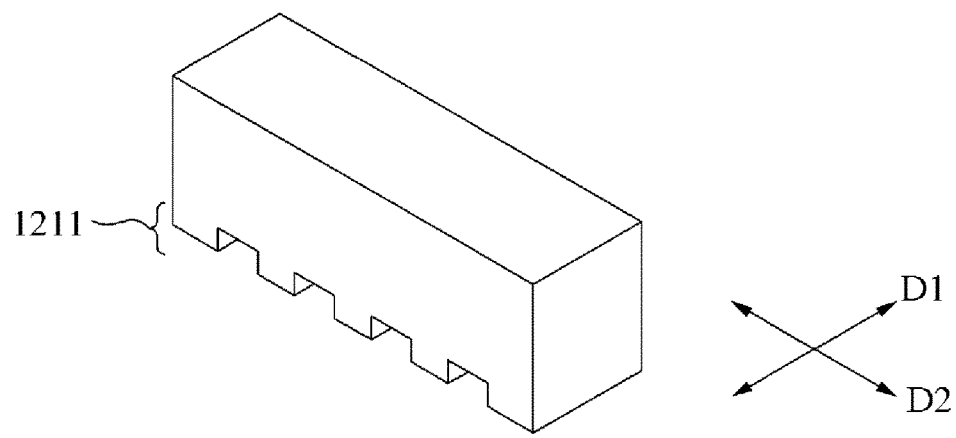
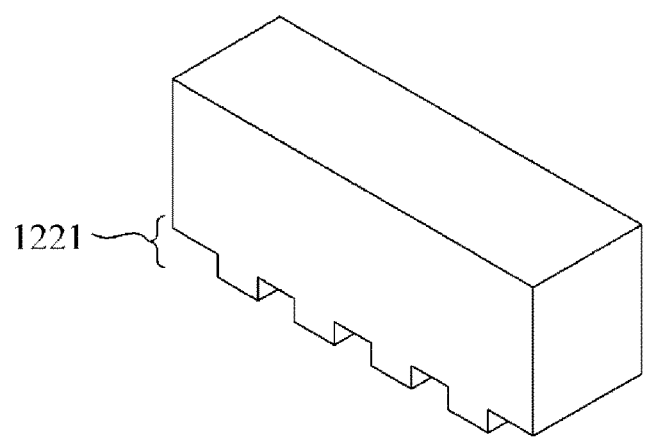

BACKLIGHT UNIT AND DISPLAY DEVICE COMPRISING THE SAME

CROSS-REFERENCE TO RELATED APPLICATION

This application claims priority from Korean Patent Application No. 10-2016-0159378, filed on Nov. 28, 2016 in the Korean Intellectual Property Office, the disclosure of which is incorporated herein by reference in its entirety.

BACKGROUND

1. Field

Methods and apparatuses consistent with exemplary embodiments in this disclosure relate to a backlight unit and a display device including the same.

2. Description of the Related Art

A three-dimensional (3D) display may be implemented by representing images of different viewpoints to a left eye and a right eye of a viewer. The 3D display may be a glasses type or a glassless type display. The 3D display of the glassless type may dividedly represent a 3D image based on a viewpoint and dividedly represent an image in a space using an optical control device. The optical control device may include a lenticular lens and a parallax barrier. The lenticular lens may allow each pixel image to be displayed in a predetermined direction. The parallax barrier may allow a predetermined pixel to be shown from a predetermined direction through a slit. To be able to supply the 3D display to a wide range of consumers, the 3D display may be provided with a two-dimensional (2D) display in one device.

In a related art 3D display device provided with a two-dimensional (2D) display, an LED light source may be disposed in a backlight form on a lower portion of a Light Guide Plate (LGP), and when the 2D display is implemented light from the LED light source passes through an LGP layer for implementing a 3D display. Therefore, a dual LGP (or dual BLU and dual backlight unit) in the related art may cause a decrease in brightness and quality of the display compared to a device for implementing the 2D display only. In addition, in the related art 3D display, a gap between an image panel and a barrier pattern (the diffusion pattern disposed in straight line form on the lower portion of the LGP for the 3D mode) is formed such that a direction of light output from the LGP and a position of a corresponding pixel are maintained with respect to an entire area of a panel. However, the gap between the image panel and the barrier pattern may be not uniform and may have a change value with respect to the entire area of the panel due to a manufacturing error or an assembly error. The gap between the image panel and the barrier pattern is more severely changed due to contraction or expansion of the LGP based on the use temperature of the display device or deformation caused by the expansion of the LGP due to heat generated while the display device.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an exemplary embodiment, there is provided a backlight unit comprising: a first light source configured to provide first light for a three-dimensional (3D) display; a second light source configured to provide second light for a two-dimensional (2D) display; and a light guide plate comprising: a first output pattern formed on an upper surface of the light guide plate and configured to output the first light to a display panel; and a second output pattern formed on a lower surface of the light guide plate and configured to output the second light to the display panel.

The first output pattern may comprise a plurality of linear structures configured to allow the first light provided from the first light source and totally reflected internally in the light guide plate to be output through the upper surface of the light guide plate.

Each of the linear structures may have an inverse trapezoid shaped cross section.

An upper surface of the first output pattern may be fixed to the display panel using an optical adhesive such that a predetermined interval between the first output pattern and the display panel is maintained.

The second output pattern may comprise a plurality of linear structures configured to allow the second light provided from the second light source and totally reflected internally in the light guide plate to be output through the lower surface of the light guide plate.

Each of the linear structures may have at least a circularly shaped cross section or a polygon shaped cross section, and the linear structures may protrude from the light guide plate or are indented into the light guide plate.

The backlight unit may further comprise: a reflector configured to reflect light output to the lower surface of the light guide plate through the second output pattern to the display panel.

An upper surface of the reflector may be in a triangle form.

The backlight unit may further comprise: a diffuser disposed between the second output pattern and the reflector.

The first light source may be configured to provide the first light for the 3D display to the light guide plate in a first direction and the second light source may be configured to provide the second light for the 2D display to the light guide plate in a second direction.

The first direction and the second direction may be perpendicularly aligned to each other.

The first light source and the second light source may be disposed on different side surfaces of the light guide plate that do not face each other.

At least one of the first light source and the second light source may be disposed on different side surfaces of the light guide plate that face each other.

The backlight unit may further comprise: at least one reflector disposed on different side surfaces of the light guide plate that face at least one of the first light source and the second light source.

The backlight unit may further comprise: at least one light guide bar (LGB) and at least one diffuser disposed between the light guide plate and at least one of the first light source or the second light source.

According to another exemplary embodiment, a display device may comprise: a display panel configured to display in a two-dimensional (2D) mode or a three-dimensional (3D) mode; a light guide plate configured to provide light to the display panel; a first light source configured to provide first light in a first direction to the light guide plate in response to the display panel displaying in the 3D mode; and a second light source configured to provide second light in a second direction to the light guide plate in response to the display panel displaying in the 2D mode, wherein the light guide plate comprises a first output pattern configured to allow the first light to be output to the display panel and a second output pattern configured to allow the second light to be output to the display panel, the first output pattern being disposed on an upper surface of the light guide plate and the second output pattern being disposed on a lower surface of the light guide plate.

The first output pattern may comprise a plurality of linear structures configured to allow the first light provided from the first light source and totally reflected internally in the light guide plate to be output through the upper surface of the light guide plate.

The second output pattern may comprise a plurality of linear structures configured to allow the second light provided from the second light source and totally reflected internally in the light guide plate to be output through the lower surface of the light guide plate.

The display device may further comprise: a reflector configured to reflect light output to the lower surface of the light guide plate through the second output pattern to the display panel.

The first direction and the second direction may be perpendicularly aligned to each other.

The first light source and the second light source may be disposed on different side surfaces of the light guide plate that do not face each other.

The display device may further comprise: at least one light guide bar (LGB) and at least one diffuser disposed between the light guide plate and at least one of the first light source or the second light source.

According to another exemplary embodiment there is provided a light guide plate comprising: a first linear pattern disposed on a first surface in a first direction; and a second linear pattern disposed on a second surface opposite the first surface in a second direction differing from the first direction, wherein light from a first light source for a three-dimensional (3D) display is broken by the first linear pattern and light from a second light is broken for a two-dimensional (2D) display is broken by the second linear pattern.

The first direction and the second direction may be perpendicularly aligned to each other.

The first direction and the second direction may form an angle greater than 70° and less than 80°.

An angle formed by the first direction and the second direction may be determined based on a first constraint associated with quality of light for a 3D image and a second constraint associated with quality of light for a 2D image.

A cross section of the first linear pattern may be an inverse trapezoid shape.

A cross section of the second linear pattern may be at least a partially circular shape.

The first linear pattern may comprise a regular pattern and the second linear pattern comprises the regular pattern or an irregular pattern.

According to another exemplary embodiment, there is provided a light guide plate comprising: a lower portion comprising a plurality of first structures formed on a lower surface of the lower portion; and an upper portion comprising a plurality of second structures formed on an upper surface of the upper portion, the plurality of second structures configured to allow a portion of a from a light source to exit light guide plate, and a cross section of at least one of the plurality of second structures having an inverted trapezoid form.

The plurality of first structures may be at least one of protrusions or indentations.

The plurality of second structures may be formed at uniform intervals.

A cross section of at least one of the plurality of first structures may have at least a partially circular form.

The upper portion may output directional light to a display panel in response to the light being provided from a three-dimensional (3D) light source.

The lower portion may output uniform light to a display panel in response to the light being provided from a two-dimensional (2D) light source.

According to another aspect of an example embodiment, there is provided a method of manufacturing a backlight unit including forming a first output pattern for outputting directional light to a display panel using light provided from a first light source, forming a second output pattern, at a lower surface of a light guide plate, for outputting nondirectional light to the display panel using light provided from a second light source, and attaching the first output pattern to an upper surface of the light guide plate.

The forming of the first output pattern may include pressing a mold having a groove in a trapezoid form or a triangle form on a first film coated with resin, curing the resin of the first film in a state in which the mold is pressed on the first film, stopping the pressing by the mold, allowing a protrusion in a trapezoid form or a triangle form formed by curing the resin of the first film to be in contact with a second film coated with resin, and curing the resin of the second film in a state in which the protrusion of the first film is in contact with the second film.

The method of manufacturing the backlight unit may further include forming the first light source and the second light source on different side surfaces of the light guide plate that do not face each other. The method of manufacturing the backlight unit may further include forming a reflector configured to reflect light output to the lower surface of the light guide plate to the display panel at a lower surface of the second output pattern.

BRIEF DESCRIPTION OF THE DRAWINGS

The above and/or other aspects will be more apparent by describing certain exemplary embodiments with reference to the accompanying drawings, in which:

FIGS. 10 through 12 each illustrate a second output pattern according to various exemplary embodiments;

DETAILED DESCRIPTION

Figure 1:
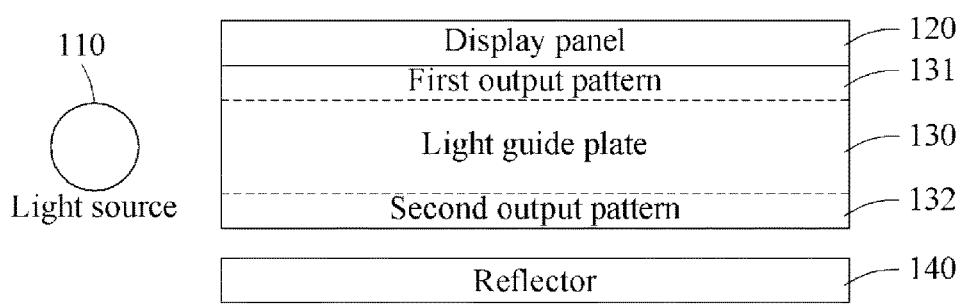
FIG. 1 illustrates a display device according to an exemplary embodiment.

Specific structural or functional descriptions of exemplary embodiments provided in the present disclosure are exemplary to merely describe the examples. The exemplary embodiments may be modified and implemented in various forms, and the scope of the examples is not limited to the descriptions provided in the present specification.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Examples to be provided below may be used to display a two-dimensional (2D) image or a three-dimensional (3D) image in a display device. Examples may be implemented in various products, for example, a personal computer (PC), a laptop computer, a tablet computer, a smartphone, a television (TV), a smart home appliance, an intelligent vehicle, a wearable device, and a digital information display (DID).

Hereinafter, reference will now be made in detail to examples with reference to the accompanying drawings, wherein like reference numerals refer to like elements throughout.

FIG. 1 illustrates a display device according to an exemplary embodiment. Referring to FIG. 1, a display device 100 includes a light source 110, a display panel 120, a light guide plate 130, and a reflector 140. FIG. 1 illustrates a cross section of the display device 100. As will be described in detail below, the display device 100 may provide a 2D image and a 3D image. According to an exemplary embodiment, a noise caused by realizing the 2D image and the 3D image in a single device may be controlled, because structures for the 2D image and structures for the 3D image do not affect each other in the display device 100. For instance, a sufficient amount of light may be uniformly provided to the 2D image because the structures for the 3D image do not affect light for the 2D image when the light for the 2D image is provided. Also, directional light needed for the 3D image may be provided, because the structures for the 2D image do not affect light for the 3D image when the light for the 3D image is provided. In addition, in the display device 100, an upper surface of a first output pattern 131 is fixed to the display panel 120 such that a relative position between a pixel of the display panel 120 and a direction of beam output from a backlight may be uniformly maintained relative to an entire area of the display panel 120. Thus, quality deterioration of the 3D image may be controlled. Accordingly, the display device 100 may provide the 2D image and the 3D image with relatively high quality.

The display panel 120 may output the 2D image or the 3D image. According to an exemplary embodiment, the display panel may include a processor (computer processing unit) or a controller that controls the display panel to output the 2D image or the 3D image. The 2D image may require an entirely uniform backlight that represents an identical image within a range of a viewing angle. The backlight may be implemented by nondirectional light. A 3D display may be implemented by representing images of different viewpoints on each of a left eye and a right eye of a viewer. A 3D display of a glassless type may represent a 3D image by spatially dividing the 3D image based on a viewpoint. Thus, the 3D image may include the images of different viewpoints and require directional light. In an example, for the 2D image, the nondirectional light may be provided to the display panel 120 through the light source 110, a second output pattern 132 of the light guide plate 130, and the reflector 140. For the 3D image, the directional light may be provided to the display panel 120 through the light source 110 and the first output pattern 131 of the light guide plate 130.

The light source 110 provides light to the light guide plate 130. According to an exemplary embodiment, the processor (computer processing unit) or the controller may control the light source 110 to output light for a 2D display mode or the 3D display mode. The light source 110 may provide light in different directions for each of the 2D image and the 3D image. For example, in response to the 3D image being output to the display panel 120, the light source 110 provides light in a first direction to the light guide plate 130. In response to the 2D image being output to the display panel 120, the light source 110 provides light in a second direction to the light guide plate 130. The light guide plate 130 may guide light incident from the light source 110 in the light guide plate 130 based on a total internal reflection condition.

The light guide plate 130 includes the first output pattern 131 on an upper surface of the light guide plate 130 and the second output pattern 132 on a lower surface of the light guide plate 130. Light provided from the light source 110 to the light guide plate 130 may be totally reflected internally along the light guide plate 130 in response to the total internal reflection (TIR) condition being satisfied. The light provided from the light source 110 to the light guide plate 130 may be output to an outside of the light guide plate 130 and provided to the display panel 120 in response to the total internal reflection condition being not satisfied due to the first output pattern 131 or the second output pattern 132.

Each of the first output pattern 131 and the second output pattern 132 may have a structure that reacts only with light provided in a predetermined direction. For example, the first output pattern 131 has a structure that reacts only with the light provided in the first direction, and the second output pattern 132 has a structure that reacts only with the light provided in the second direction. In an example, the first output pattern 131 reacts only with the light provided in the first direction through a structure in which the first output pattern 131 is perpendicular to the first direction and parallel to the second direction. The second output pattern 132 reacts only with light provided in the second direction through a structure in which the second output pattern 132 is perpendicular to the second direction and parallel to the first direction. However, it is not necessary that an output pattern, for example, a first output pattern or a second output pattern, be always perpendicular to an output direction, for example, a first direction or a second direction.

The first output pattern 131 may provide the directional light to the display panel 120 for the 3D image, and the second output pattern 132 may provide the uniform nondirectional light to the display panel 120 for the 2D image. The first output pattern 131 may provide the directional light through a structure that allows the total internal reflection condition to be broken in response to a predetermined directivity condition being satisfied. As will be described in detail below, the directional light may be provided by an inverted trapezoid shaped pattern of the first output pattern 131. The second output pattern 132 may provide uniform light through a structure that allows the total internal reflection condition to be uniformly broken in various directions. The second output pattern 132 may output the light of which the total internal reflection is broken to the lower surface of the light guide plate 130. The reflector 140 may reflect the light output through the second output pattern 132 to the display panel 120. The reflector 140 may increase uniformity of the light provided to the 2D image by uniformly reflecting the light in various directions when reflecting the light.

Figure 2:
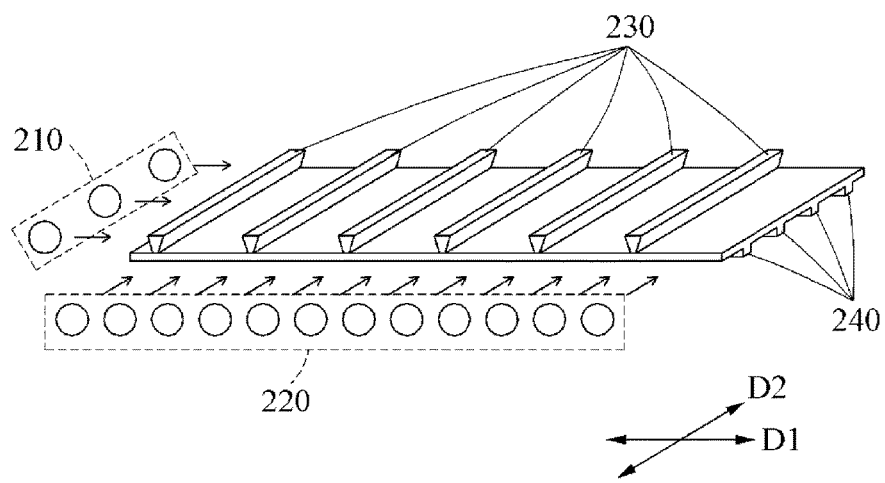
FIG. 2 illustrates light sources and output patterns according to an exemplary embodiment.

FIG. 2 illustrates light sources and output patterns according to an example embodiment. Referring to FIG. 2, a first light source 210 and a second light source 220 provide lights to a light guide plate in a first direction D1 and a second direction D2, respectively. The light sources 210 and 220 include various light sources, for example, light emitting diode (LED) light sources or laser diode (LD) light sources. To provide uniform light to the light guide plate, an additional light source or a reflector may be disposed on a side opposite the light sources 210 and 220. The light guide plate includes a first output pattern 230 and a second output pattern 240. Each of the first output pattern 230 and the second output pattern 240 may include a plurality of linear patterns. The linear patterns of the first output pattern 230 may be perpendicularly disposed to the first direction D1 and parallel to the second direction D2. The linear patterns of the second output pattern 240 may be perpendicularly disposed to the second direction D2 and parallel to the first direction D1. Thus, light provided in the first direction D1 is affected only by the first output pattern 230 and light provided in the second direction D2 is affected only by the second output pattern 240. However, it is unnecessary that the linear patterns of the first output pattern 230 be perpendicularly disposed to the first direction D1. According to exemplary embodiment, to effectively utilize pixels of a display panel in both a horizontal direction and a vertical direction when a three-dimensional (3D) image is realized, the linear patterns of the first output pattern 230 may be slanted at a predetermined angle. Even though the linear patterns of the first output pattern 230 are slanted at the predetermined angle, uniform nondirectional light for a two-dimensional (2D) image may be easily provided in response to a total internal reflection condition being not broken when the light provided in the second direction D2 is guided by the light guide plate.

In response to the 3D image being displayed on the display panel, the first light source 210 may provide the light in the first direction D1 to the light guide plate. The light provided from the first light source 210 may be totally reflected internally in the light guide plate and then output to the display panel through the first output pattern 230. In response to the 2D image being displayed on the display panel, the second light source 220 may provide the light in the second direction D2 to the light guide plate. The light provided from the second light source 220 may be totally reflected internally in the light guide plate and then output to the display panel through the second output pattern 240. The first output pattern 230 and the second output pattern 240 may provide directional light or nondirectional light to the display panel based on respective structures and forms. For example, a display device provides the 3D image for a viewer by providing the directional light to the display panel configured to output the 3D image through the first light source 210. Also, the display device provides the 2D image for the viewer by providing the nondirectional light to the display panel configured to output the 2D image through the second light source 220. Thus, the display device may easily convert the 2D image and the 3D image.

Figure 3:
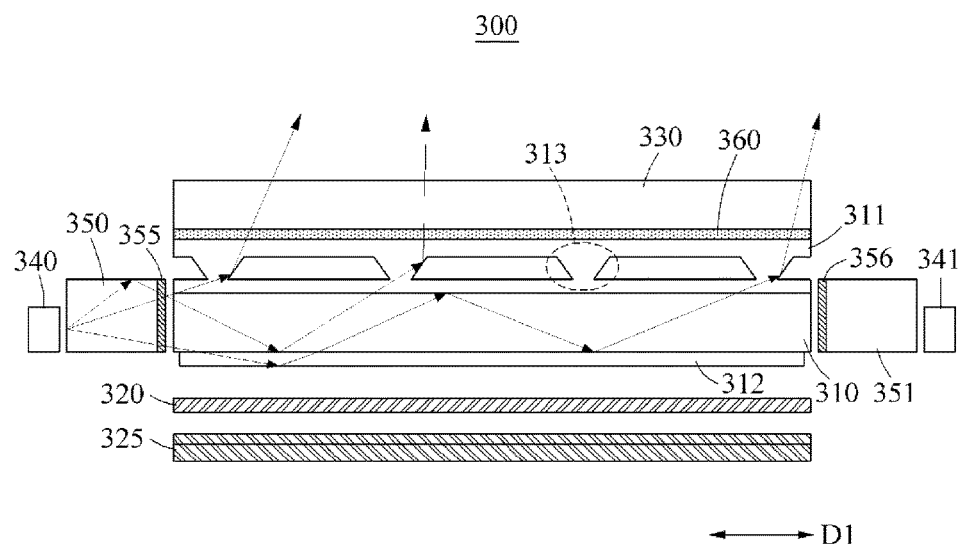
FIG. 3 illustrates a structure of a cross section of a first output pattern according to an exemplary embodiment.

FIG. 3 illustrates a structure of a cross section of a first output pattern according to an exemplary embodiment. Referring to FIG. 3, a display device 300 includes a light guide plate 310, diffusers 320, 355, and 356, a reflector 325, a display panel 330, and first light sources 340 and 341. The light guide plate 310 includes a first output pattern 311 and a second output pattern 312. FIG. 3 illustrates a cross section of the display device 300 viewed from a second direction D2. A second light source configured to provide light in the second direction D2 is omitted in FIG. 3. Arrows passing through a light guide bar (LGB) 350, the diffuser 355, the light guide plate 310, and the display panel 330 indicate paths through which the light provided from the first light source 340 travels.

The first light sources 340 and 341 provide light in the first direction D1 to the light guide plate 310. In response to a total internal reflection condition of light provided from the first light sources 340 and 341 being satisfied, the light provided from the first light sources 340 and 341 may be totally reflected internally in the light guide plate 310. Conversely, in response to the total internal reflection condition of the light provided from the first light sources 340 and 341 being broken, the light provided from the first light sources 340 and 341 may be output to an outside of the light guide plate 310. The first output pattern 311 may include a plurality of linear structures. The plurality of linear structures may have an inverse trapezoid shaped cross section 313. In another embodiment, the first output pattern 311 may include a plurality of linear protrusions. The plurality of linear protrusions may have an inverse trapezoid shaped cross section. The first output pattern 311 may break the total internal reflection condition of the light provided from the first light sources 340 and 341 through the inverse trapezoid shaped cross section 313. Thus, the light provided from the first light sources 340 and 341 may be output to the display panel 330 through the inverted trapezoidal cross section 313.

The plurality of linear structures having the inverse trapezoid shaped cross section 313 may each be disposed at a predetermined interval to form the first output pattern 311. The light provided from the first light sources 340 and 341 may have directivity at an angle formed by the reverse trapezoid shaped cross section 313 and may be output to the display panel 330. Thus, the first output pattern 311 may provide directional light. By adjusting the angle formed by the reverse trapezoid shaped cross section 313, a distribution of output light may be adjusted such that a viewing angle of a three-dimensional (3D) image may be adjusted.

As described above with reference to FIG. 2, the linear structures of the first output pattern 311 and the linear patterns of the second output pattern 312 may be perpendicularly disposed to each other or disposed at an angle close to perpendicular. Because FIG. 3 illustrates the cross section of the display device 300 viewed from the second direction D2, the second output pattern 312 is represented as a straight line. Due to a feature of straightness of light, the second output pattern 312 does not substantially affect the light provided from the first light sources 340 and 341 and the total internal reflection condition of the light provided from the first light sources 340 and 341 may not be broken by the second output pattern 312. Thus, the light provided from the first light sources 340 and 341 may not be output to the outside of the light guide plate 310 by the second output pattern 312.

As will be described in detail below in FIGS. 10-12, the second output pattern 312 may be indented or protrude. A position at which the light provided from the first light sources 340 and 341 is totally reflected internally may be different based on a form of the second output pattern 312, but the light provided from the first light sources 340 and 341 may be totally reflected internally without being output to the outside of the light guide plate 310 by the second output pattern 312. The diffuser 320 and the reflector 325 may diffuse and reflect light output to the outside of the light guide plate 310 by the second output pattern 312. Because the light provided from the first light sources 340 and 341 is not output to the outside of the light guide plate 310 by the second output pattern 312, the diffuser 320 and the reflector 325 may not affect the light provided from the first light sources 340 and 341. As will be described in detail below, light of a second light source may be provided to the diffuser 320 and the reflector 325.

The LGB 350, an LGB 351, and the diffusers 355 and 356 may allow the light provided from the first light sources 340 and 341 to be uniformly diffused and incident on the light guide plate 310. The diffusers 355 and 356 may be attached to the LGBs 350 and 351 in a direction of the light guide plate 310, respectively. The LGBs 350 and 351 and the diffusers 355 and 356 may uniformly provide light to inverse trapezoid shaped cross sections each disposed at a predetermined interval by varying vertical and horizontal angles of the light provided in the first direction D1. Also, the LGBs 350 and 351 and the diffusers 355 and 356 may allow the light to be uniformly diffused in a right direction and a left direction and to be incident on the light guide plate 310. Thus, brightness of images corresponding to various viewpoints may be uniform and brightness of pixels in an image corresponding to one viewpoint may also be uniform.

According to an exemplary embodiment illustrated in FIG. 3, the first light sources 340 and 341 and the LGBs 350 and 351 are disposed on both side surfaces of the light guide plate 310. This arrangement of the first light sources 340 and 341 and the LGBs 350 and 351, however, is exemplary. The first light sources 340 and 341 and the LGBs 350 and 351 may be variously disposed based on different methods. For example, according to another exemplary embodiment, the first light source 340 and the LGB 350 may be disposed on a first side surface of the light guide plate 310 and the reflector 325 may be disposed on a second side surface the light guide plate 310, which is opposite to the first side. The reflector 325 may provide light to a side surface on which the first light source 340 is not disposed by reflecting the light provided from the first light source 340. The reflector may be disposed to reflect the light in various directions. In particular, the reflector 325 may have a surface in a triangle form in order to allow light reflected by the reflector 325 to be incident on another surface of the light guide plate 310 at a perpendicular incident angle similar to a perpendicular incident angle of light incident on one surface of the light guide plate 310 from the first light source 340.

An upper surface of the first output pattern 311 may be fixed to the display panel 330 using an optical adhesive 360 such that a predetermined interval between the first output pattern 311 and the display panel 330 is maintained. For the total internal reflection condition, the light guide plate 310 may be surrounded by a medium having a density lower than a density of the light guide plate 310. For example, in general, an air layer may be formed outside the light guide plate 310. To maintain the air layer between the light guide plate 310 and the display panel 330, the light guide plate 310 may not be attached to an entire surface of the display panel 330. As such, the light guide plate 310 may be mechanically fixed to the display panel 330. According to an exemplary embodiment, it may be desirable to provide directional light having an accurate angle to the display panel 330 in order to prevent quality deterioration of the 3D image. That is, it may be desirable to accurately fix the light guide plate 310 and the display panel 330 and maintain a state in which the light guide plate 310 and the display panel 330 are fixed. According to an exemplary embodiment of the first output pattern 311, the air layer may be formed between the inverse trapezoid shaped cross sections, and a plane may be formed on the upper surface of the first output pattern 311. Thus, the upper surface of the first output pattern 311 is fixed to the entire surface of the display panel 330 using the optical adhesive 360 such that an interval between the light guide plate 310 and the display panel 330 may be maintained. As will be described in detail below, the first output pattern 311 may be manufactured in a form of a film and easily bonded to the display panel 330 using the optical adhesive 360.

Figure 4:
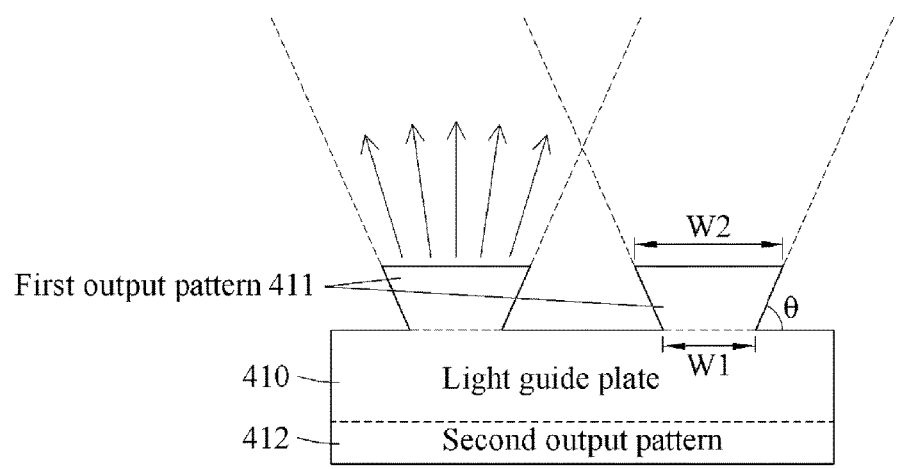
FIG. 4 illustrates a light output formed by a first output pattern according to an exemplary embodiment.

FIG. 4 illustrates a light output formed by a first output pattern according to an exemplary embodiment. Referring to FIG. 4, a light guide plate 410 includes a first output pattern 411 on an upper surface of the light guide plate 410 and a second output pattern 412 on a lower surface of the light guide pattern 310. For ease of description, FIG. 4 illustrates that the first output pattern 411 has a reverse trapezoid shaped cross section. In response to light provided in a first direction D1 reaching the first output pattern 411, a total internal reflection condition of the light provided in the first direction D1 may be broken. The light having the total internal reflection condition broken may be output to an outside of the light guide plate 410 through the reverse trapezoid shaped cross section. Because the reverse trapezoid shaped cross section has a predetermined angle, directional light for a three-dimensional (3D) image may be formed through the inverse trapezoid shaped cross section.

According to an exemplary embodiment, a feature of the directional light may be adjusted through a form of the inverse trapezoid shaped cross section. The inverse trapezoid shaped cross section of the first output pattern 411 includes a base line having a width W1, an upper base having a width W2, and two slanted side lines. The slanted side lines of the inverse trapezoid shaped cross section and the light guide plate 410 form an angle θ. An amount of the directional light output through the first output pattern 411 may be adjusted by adjusting the width W1. For example, when the width W1 increases, the amount of the directional light provided to the 3D image may increase and the 3D image may be relatively bright. However, when the width W1 is adjusted, uniformity of the 3D image is affected by the width W1 such that the width W1 is generally designed to be an optimal value. In addition, a distribution of the directional light output through the first output pattern 311 may be adjusted by adjusting the width W2 and a viewing angle of the 3D image may be adjusted by adjusting the distribution of the directional light.

Figure 5:
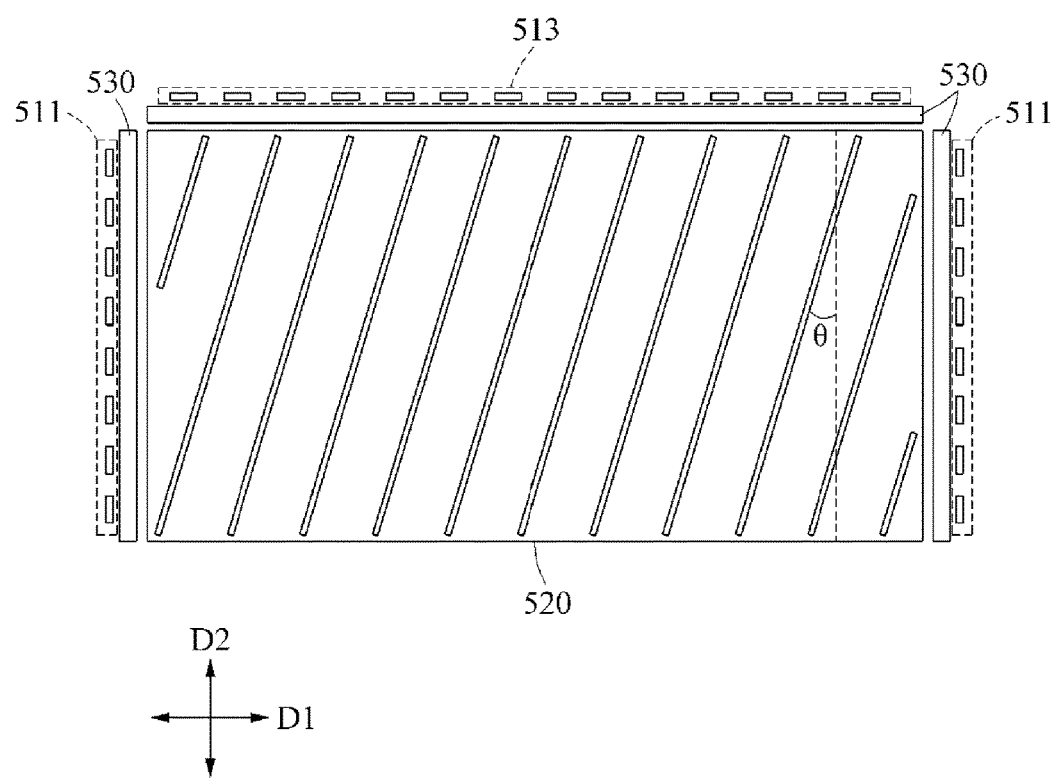
FIG. 5 illustrates an arrangement of a first output pattern and light sources according to an exemplary embodiment.

FIG. 5 illustrates an arrangement of a first output pattern and light sources according to an exemplary embodiment. Referring to FIG. 5, a first light source 511 is disposed on each of a left side and a right side of a light guide plate 520, and a second light source 513 is disposed on another side of the light guide plate 520 that is adjacent to the left side and the right side of the light guide plate 520. The arrangement of the first light source 511 and the second light source 513 of FIG. 5 is merely exemplary, and therefore the first light source 511 and the second light source 513 may be arranged in various manners. For instance, the first light source 511 and the second light source 513 may be disposed on different side surfaces of the light guide plate 520 that do not face each other. Also, each of the first light source 511 and/or the second light source 513 may be disposed on different side surfaces of the light guide plate 520 that face each other. For example, unlike FIG. 5, the second light source 513 is disposed both below and above the light guide plate 520. In addition, in response to the first light source 511 and the second light source 513 being disposed on only one side of the light guide plate 520, a reflector may be disposed on the other side of the light guide plate 520. For example, the reflector may be disposed below the light guide plate 520 which is opposite to the second light source 513. A light guide bar (LGB) 530 may be disposed between the light guide plate 520 and each of the first light source 511 and the second light source 513.

According to an exemplary embodiment, FIG. 5 illustrates a plane of the light guide plate 520 having the first output pattern disposed on an upper surface of the light guide plate 520. The first output pattern may include a plurality of linear structures. The linear patterns may have the above-described inverse trapezoid shaped cross section.

In an example, the first output pattern may form a second direction D2 and an angle θ. Here, the angle θ indicates a slanted angle. As the first output pattern forms the slanted angle, a resolution degradation phenomenon occurring in a single direction, for example, a horizontal direction or a vertical direction, in a glassless type 3D display may be distributed in the horizontal direction and the vertical direction. In addition, a black stripe phenomenon occurring in the glassless type 3D display may be removed. Thus, quality of the 3D image may be enhanced and a number of viewpoints included in the 3D image may be increased.

The slanted angle may be determined based on a method identical to a method of determining an angle of a slanted lenticular lens in the glassless type 3D display technology. That is, the first output pattern may be formed based on a 3D display technology applied to a display panel. For example, the angle θ is determined based on a number of viewpoints of the 3D image displayed on the display panel, a resolution of the display panel, a pitch of the first output pattern, and/or a correlation between a pixel pattern of the display panel and the first output pattern.

According to an exemplary embodiment, in order to prevent possible deterioration of the quality of the uniformity of nondirectional light for the 2D image due to the slanted angle of the first output pattern, a range of the slanted angle may be limited such that a degree of quality deterioration of the light for the 2D image is within a predetermined threshold.

For example, the slanted angle may have a value greater than 10° and less than 20° based on a quality, for example, an image quality or a number of viewpoints, of the light for the 3D image and the quality, for example, a uniformity of nondirectional light, of the light for the 2D image. In this example, the first output pattern and a second output pattern may form an angle greater than 70° and less than 80°. In more detail, the angle θ may be 12.5°, and the first output pattern and the second output pattern may form an angle of 77.5°.

The above-described numerical values are merely exemplary, and therefore, the above-described numerical values may be variously changed based on a first constraint associated with the quality of the light for the 3D image and a second constraint associated with the quality of the light for the 2D image. For example, the first constraint includes a threshold angle or an angle range for increasing the quality of the light for the 3D image to be greater than or equal to a first threshold quality, and the second constraint includes a threshold angle or an angle range for preventing the quality of the light for the 2D image from being reduced to be less than or equal to a second threshold quality.

FIG. 5 illustrates the arrangement in which the first light source 511 provides light in the first direction D1 regardless of the angle θ. In FIG. 5, a sufficient amount of light may also effectively reach the reverse trapezoid shaped cross section of the first output pattern. Even though the first output pattern is slanted at a predetermined angle, a form of the cross section of the first output pattern may be substantially the same as the reverse trapezoid shaped cross sections illustrated in FIGS. 3 and 4 and therefore effects of the cross sections may be substantially the same. According to an example of FIG. 5, there may be partial interference caused by the first output pattern in a 2D mode for the 2D image. However, the 2D mode is a mode that diffuses light incident on the light guide plate 520 as the nondirectional light such that the partial interference caused by the first output pattern may be substantially ignored because a portion of the directional light occurring due to the partial interference is covered by nondirectional lights.

Figure 6:
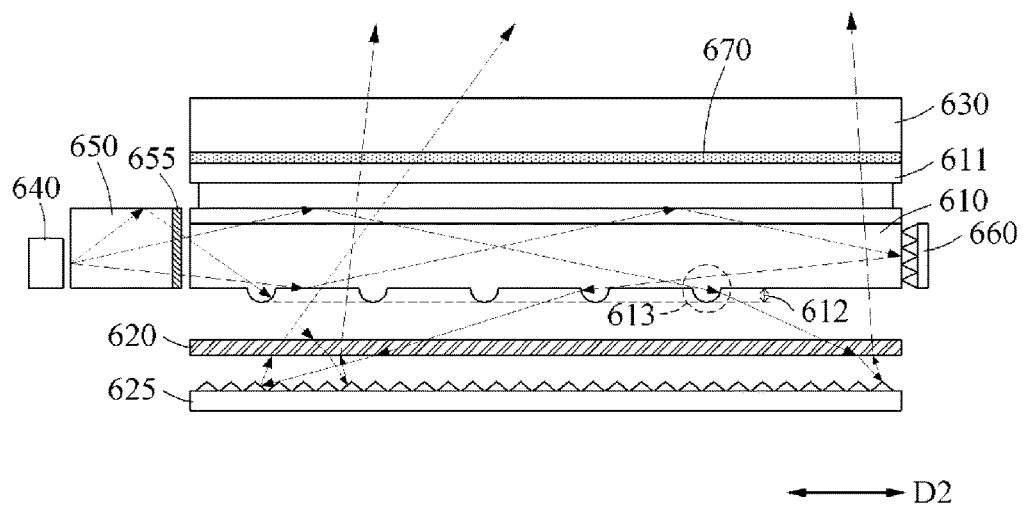
FIG. 6 illustrates a structure of a cross section of a second output pattern according to an exemplary embodiment.

FIG. 6 illustrates a structure of a cross section of a second output pattern according to an exemplary embodiment. Referring to FIG. 6, a display device 600 includes a light guide plate 610, a diffuser 620, a reflector 625, a display panel 630, and a second light source 640. The light guide plate 610 includes a first output pattern 611 and a second output pattern 612. FIG. 6 illustrates a cross section of the display device 600 viewed from a first direction D1. In FIG. 6, a first light source configured to provide light in the first direction D1 is omitted and a reverse trapezoid shaped cross section of the first output pattern 611 is not shown. Arrows passing through a light guide bar (LGB) 650, a diffuser 655, the light guide plate 610, and the display panel 630 indicate paths through which light provided from the second light source 640 travels.

The second light source 640 provides light in a second direction D2 to the light guide plate 610. In response to a total internal reflection condition of the light provided from the second light source 640 being satisfied, the light provided from the second light source 640 may be totally reflected internally in the light guide plate 610. In response to the total internal reflection condition of the light provided from the second light source 640 being broken, the light provided from the second light source 640 may be output to an outside of the light guide plate 610. A semi-circle shaped cross section 613 is merely exemplary, and therefore, the second output pattern 612 may have a circle shaped cross section, partially circular shaped cross section or a polygon shaped cross section. The second output pattern 612 may protrude from the light guide plate 610 or may be indented into the light guide plate 610. The second output pattern 612 may break the total internal reflection condition of the light provided from the second light source 640 through the semi-circle shaped cross section 613. Thus, the light provided from the second light source 640 may be output to a lower portion of the light guide plate 610 through the semi-circle shaped cross section 613, and reflected by the reflector 625 to be provided to the display panel 630.

Circle or partially-circular shaped cross sections, for example, the semi-circle shaped cross section 613, may be disposed at various intervals in the second output pattern, and the second output pattern 612 may provide light at various intervals to the diffuser 620. The diffuser 620 may diffuse the light provided from the second output pattern 612. The diffuser 620 may provide light in various directions to the reflector 625 by varying horizontal and vertical angles of the light provided from the second output pattern 612. The reflector 625 may reflect light provided from the diffuser 620 to the display panel 630. The reflector 625 may have an upper surface in a triangle form in order to increase a front surface luminance by adjusting a viewing angle of a two-dimensional (2D) image. The reflector 625 may allow lights that are widely diffused by the diffuser 620 to be concentrated at a center portion of the display panel 630 through the triangle form. An angle of light provided to the display panel 630 may be adjusted based on a gradient of a triangle form positioned at an upper surface of the reflector 625 such that the viewing angle of the 2D image may be adjusted. The light provided from the second light source 640 may be reflected by the reflector 625 and then partially refracted through the diffuser 620, the light guide plate 610, and an optical adhesive 670 to be provided to the display panel 630. The light provided from the second light source 640 may become nondirectional light by passing through the semi-circle shaped cross section 613 of the second output pattern 612, the diffuser 620, and the reflector 625 and then may be provided to the display panel 630. Thus, a 2D image having uniform brightness may be provided through the display panel 630.

The second light source 640 may provide the light in the second direction D2 to the light guide plate 610 through the LGB 650. The LGB 650 and the diffuser 655 may allow the light provided from the second light source 640 to be uniformly diffused such that the light provided from the second light source 640 is incident on the light guide plate 610. The diffuser 655 may be attached to the LGB 650 in a direction of the light guide plate 610. The LGB 650 and the diffuser 655 may uniformly diffuse light to circle shaped cross sections by varying horizontal and vertical angles of the light provided in the second direction D2. Also, the LGB 650 and the diffuser 655 may allow the light to be uniformly diffused in a right direction and a left direction to be incident on the light guide plate 610. In FIG. 6, the second light source 640 and the LGB 650 are disposed on a left side surface of the light guide plate 610 and a reflector 660 is disposed on a right side surface of the light guide plate 610. The arrangement of the second light source 640, the LGB 650, and the reflector 660 illustrated in FIG. 6 is only an example. The second light source 640 and the LGB 650 may be disposed on the right side surface of the light guide plate 610 instead of the reflector 660. The reflector 660 may provide light to a side surface on which the second light source 640 is not disposed by reflecting the light provided from the second light source 640. The reflector 660 may be disposed to reflect the light in various directions. In particular, the reflector 660 may have a surface in a triangle form in order to allow light reflected by the reflector 660 to be incident on the other surface of the light guide plate 610 at a vertical incident angle similar to a vertical incident angle of light incident on one surface of the light guide plate 610 from the second light source 640. The reflector 660 may provide the light to the light guide plate 610 in a way similar to the light is provided through the second light source 640 and the LGB 650 through the surface of the triangle form.

As described above, the first output pattern 611 and the second output pattern 612 may be vertically disposed to each other or disposed at an angle between 70° and 80° which is close to vertical. Because FIG. 6 illustrates the cross section of the display device 600 viewed from the first direction D1, the output pattern 611 is represented as a straight line. Even though the total internal reflection condition of the light provided from the second light source 640 through the first output pattern 611 is broken or satisfied, the light provided from the second light source 640 is covered by nondirectional lights. Thus, the first output pattern 611 may not substantially affect the light provided from the second light source 640.

Figure 7:
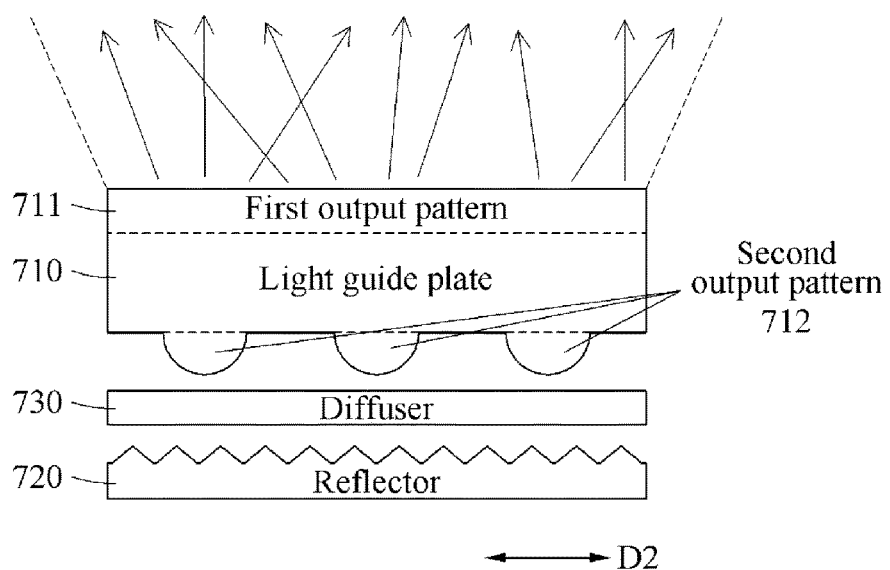
FIG. 7 illustrates a light output formed by a second output pattern according to an exemplary embodiment.

FIG. 7 illustrates a light output formed by a second output pattern according to an exemplary embodiment. Referring to FIG. 7, a light guide plate 710 includes a first output pattern 711 at an upper surface of the light guide plate 710 and a second output pattern 712 at a lower surface of the light guide plate 710. In response to light provided in a second direction D2 reaching the second output pattern 712, a total internal reflection condition of the light provided in the second direction D2 may be broken. The light of which the total internal reflection condition is broken may be output to an outside of the light guide plate 710 through a circle shaped cross section or a partially circular shaped cross section of the second output pattern 712 and provided to a reflector 720 by passing through a diffuser 730. The light passing through the diffuser 730 may be diffused and provided as nondirectional light in various directions. Because an angle of light reflected by the reflector 720 is different depending on a triangle form of the reflector 720, a viewing angle of a two-dimensional (2D) image may be different. In addition, the viewing angle of the 2D image may be different based on a diffusion angle of the diffuser 730.

According to an exemplary embodiment, the second output pattern 712 may be integrally produced at one time in a light guide plate forming process, when the light guide plate is formed. For example, the second output pattern 712 may be integrally produced using a mold provided in a shape of the second output pattern. According to another exemplary embodiment, the second output pattern 712 may be produced separately from the light guide plate 710. That is, the second output pattern 712 may be produced in a film form, and may be bonded to the light guide plate 710. The second output pattern 712 may also be formed by various other processes and techniques.

Figure 8:
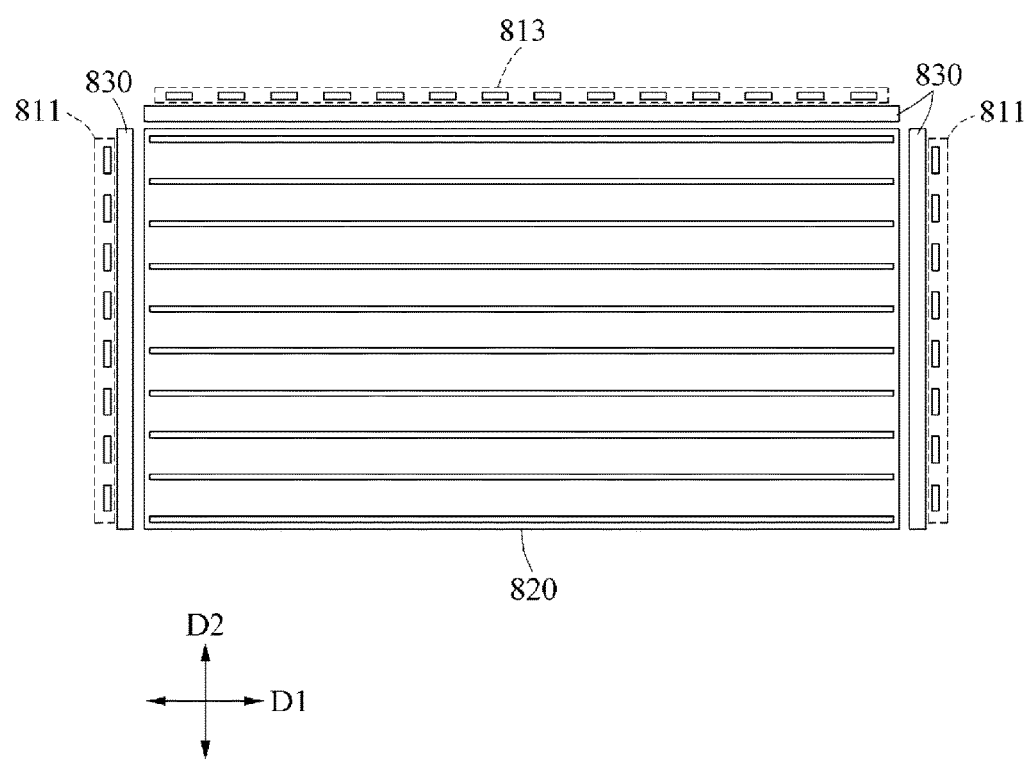
FIG. 8 illustrates an arrangement of a second output pattern and light sources according to an exemplary embodiment.

FIG. 8 illustrates an arrangement of a second output pattern and light sources according to an exemplary embodiment. Referring to FIG. 8, a first light source 811 is disposed on each of a left side and a right side of a light guide plate 820, and a second light source 813 is disposed above the light guide plate 820. As described above, the arrangement of the first light source 811 and the second light source 813 illustrated in FIG. 8 is merely exemplary. The first light source 811 and the second light source 813 may be disposed in different forms. FIG. 8 illustrates a plane of the light guide plate 820 according to an exemplary embodiment. FIG. 8 illustrates that a second output pattern may be disposed on a lower surface of the light guide plate 820. The second output pattern may include a plurality of linear structures. The plurality of linear structures may have a circle shaped cross section, partially circular shaped cross section or a polygon shaped cross section. The linear structures may protrude from the light guide plate 820 or may be indented into the light guide plate 820. A light guide bar (LGB) 830 may be disposed between the light guide plate 820 and each of the first light source 811 and the second light source 813.

Figure 9A:
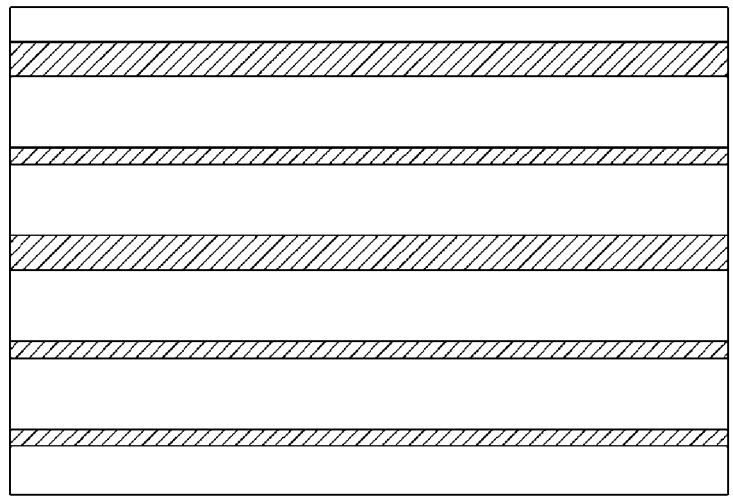
FIGS. 9A and 9B each illustrate a structure of a plane of a second output pattern according to various exemplary embodiments.
Figure 9B:

FIGS. 9A and 9B each illustrate a structure of a plane of a second output pattern according to a respective exemplary embodiment. When a second output pattern includes a regular pattern, a brightness of a two-dimensional (2D) image may not be uniform due to a gradually decreasing amount of light output while passing through a light guide plate. Thus, the second output pattern may include an irregular pattern. For example, referring to FIG. 9A, the second output pattern includes a plurality of linear structures having different widths. Also, the linear patterns may be disposed at different intervals. Referring to FIG. 9B, the second output pattern includes group patterns 910 and 920. Each of the group patterns 910 and 920 includes a plurality of linear structures having an identical width and an identical interval. The group patterns 910 and 920 may include different numbers of linear structures having different widths, or include linear structures having different intervals. In addition, various irregular linear patterns may be applied to the second output pattern.

Figure 11:
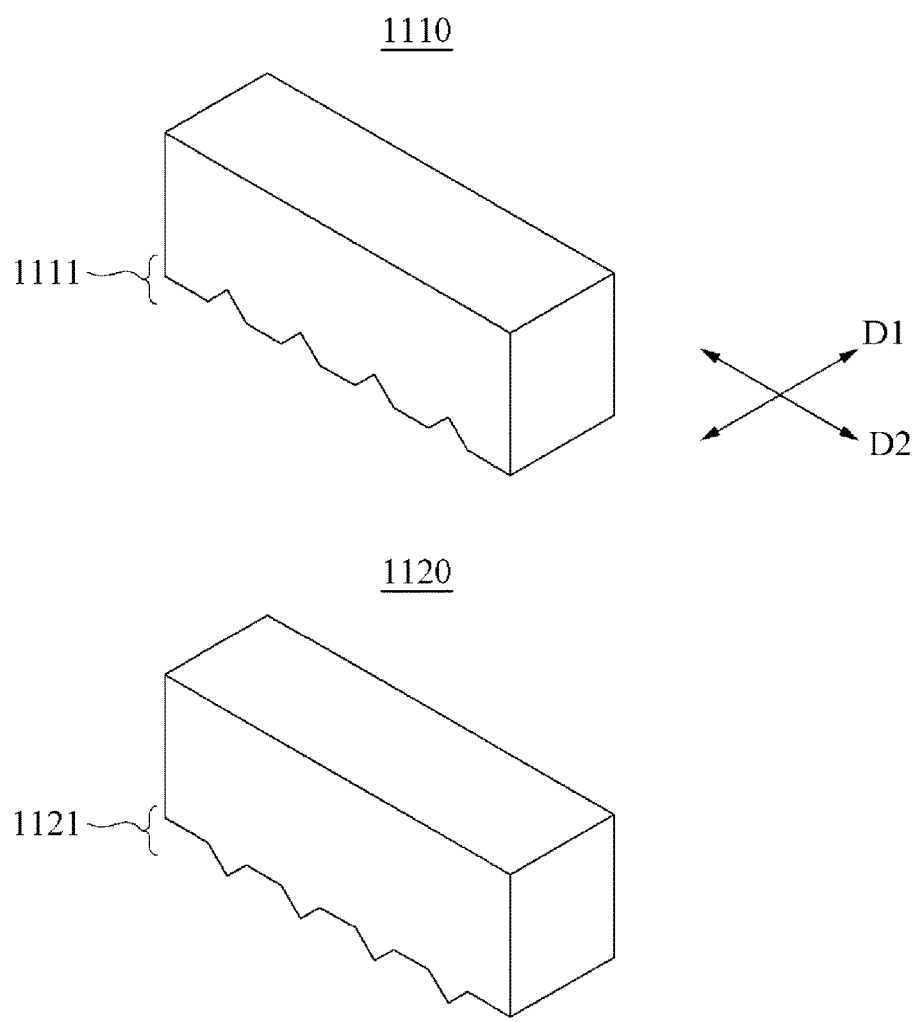

FIGS. 10 through 12 each illustrate a second output pattern according to an exemplary embodiment. As described above, a plurality of linear structures included in a second output pattern may have a circle shaped cross section, partially circular shaped cross section or a polygon shaped cross section. Also, the linear structures may protrude from a light guide plate or may be indented into the light guide plate. According to an exemplary embodiment, FIG. 10 illustrates a form in which a linear pattern 1011 having a plurality of linear structures that are indented into a light guide plate 1010 and a form in which a linear pattern 1021 having a plurality of semi-circle shaped cross section structures that protrude from a light guide plate 1020. FIG. 11 illustrates a prism form in which a linear pattern 1111 having a plurality of triangle shaped cross section structures are indented into a light guide plate 1110 and a prism form in which a linear pattern 1121 having a plurality of triangle shaped cross section structures that protrude from a light guide plate 1120. FIG. 12 illustrates a bump form in which a linear pattern 1211 having a plurality of bump shaped cross section structures that are indented into a light guide plate 1210 and a bump form in which a linear pattern 1221 having a plurality of bump shaped cross section structures that protrude from a light guide plate 1220.

Figure 13:
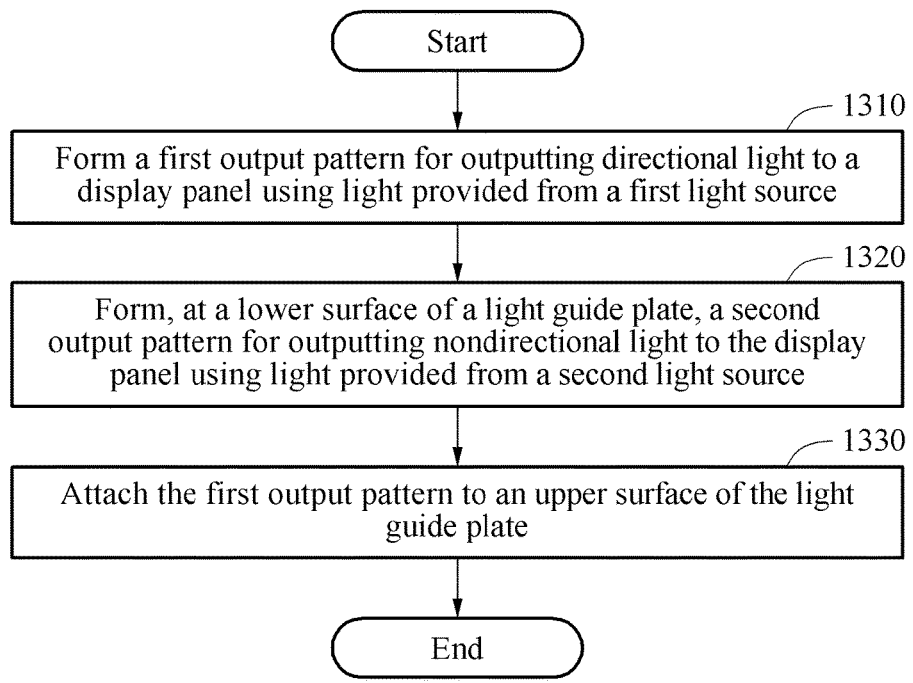
FIG. 13 is a flowchart illustrating a method of manufacturing a backlight unit according to an exemplary embodiment.

FIG. 13 is a flowchart illustrating a method of manufacturing a backlight unit according to an exemplary embodiment. Referring to FIG. 13, in operation 1310, a manufacturing apparatus forms a first output pattern for outputting directional light to a display panel using light provided from a first light source. In operation 1320, the manufacturing apparatus forms, at a lower surface of a light guide plate, a second output pattern for outputting nondirectional light to the display panel using light provided from a second light source. In operation 1330, the manufacturing apparatus attaches the first output pattern to an upper surface of the light guide plate. In an exemplary embodiment, the first output pattern is manufactured by bonding two films. Detailed description of an exemplary process of manufacturing the first output pattern will be described with reference to FIG. 14.

Figure 14:
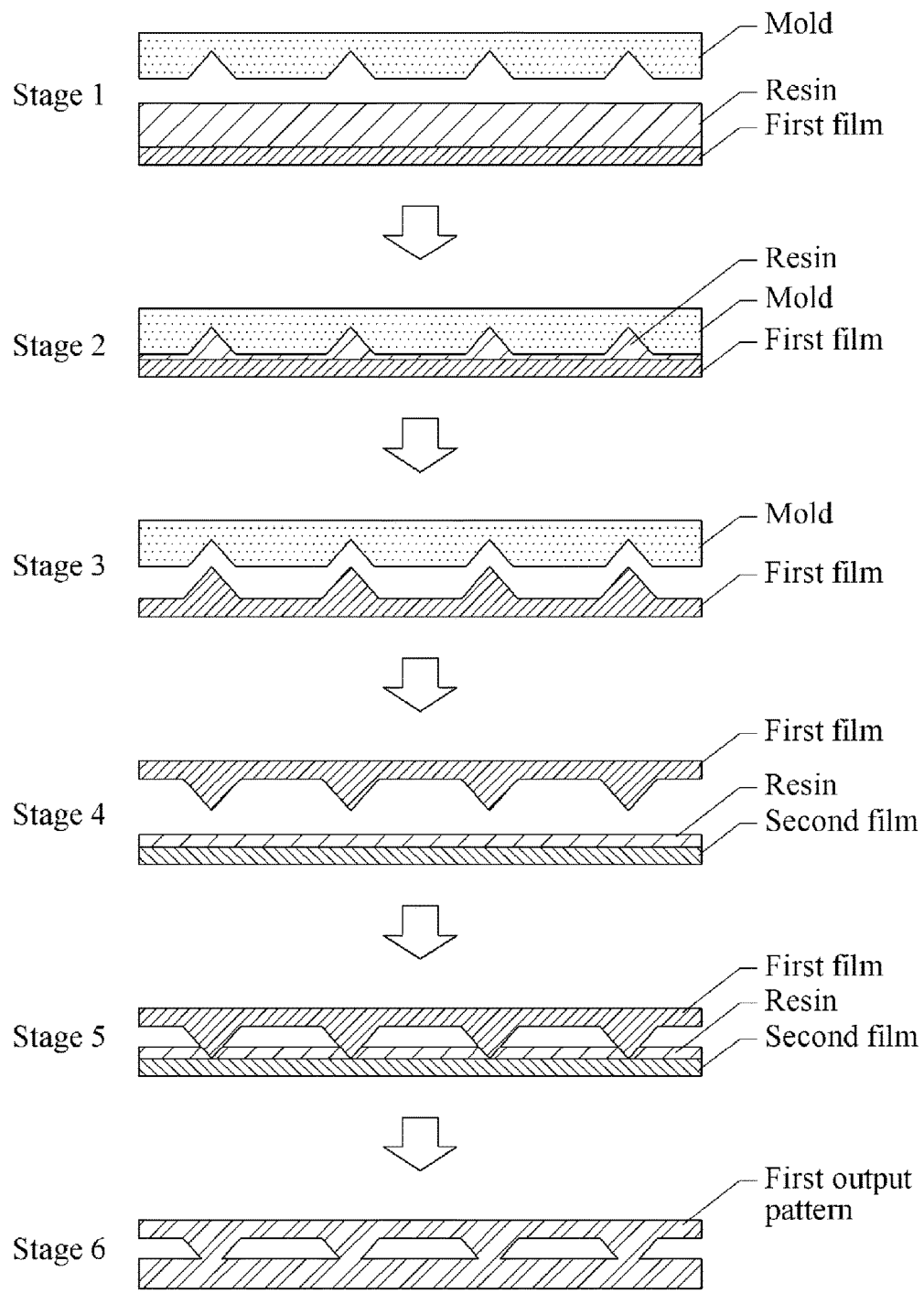
FIG. 14 illustrates a process of manufacturing a first output pattern according to an exemplary embodiment.

FIG. 14 illustrates a process of manufacturing a first output pattern according to an exemplary embodiment. Referring to FIG. 14, in a first stage (Stage 1), a manufacturing apparatus presses a mold having a groove in a trapezoid form or a triangle form on a first film coated with resin. In a second stage (Stage 2), the manufacturing apparatus cures the resin of the first film in a state in which the mold is pressed on the first film. In a third stage (Stage 3), the manufacturing apparatus stops the pressing by the mold. In a fourth stage (Stage 4) and a fifth stage (Stage 5), the manufacturing apparatus allows a protrusion in a trapezoid form or a triangle form formed by curing the resin of the first film to be in contact with a second film coated with resin. In a sixth stage (Stage 6), the resin of the second film is cured in a state in which the protrusion of the first film is in contact with the second film. In response to the resin of the second film being cured, the first film and the second film form a single film, and a first output pattern in a film form is formed. The first output pattern may be manufactured by various other processes. For example, the first output pattern is manufactured by a semiconductor process such as an etching process. In response to an output pattern being manufactured in a film form, the output pattern may be easily bonded to a light guide plate through optical bonding.

The elements or components of the display device described herein may be implemented using hardware components, software components, or a combination thereof. For example, the hardware components of the display device may include microphones, amplifiers, band-pass filters, audio to digital convertors, and processing devices. A processing device of the display device may be implemented using one or more general-purpose or special purpose computers, such as, for example, a processor, a controller and an ALU, a DSP, a microcomputer, an FPGA, a PLU, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. A backlight unit comprising:
    a first light source configured to provide first light for a three-dimensional (3D) display;
    a second light source configured to provide second light for a two-dimensional (2D) display; and
    a light guide plate comprising:
        a first output pattern formed on an upper surface of the light guide plate and configured to direct a first portion of the first light provided by the first light source to exit through the upper surface of the light guide plate towards a display panel; and
        a second output pattern formed on a lower surface of the light guide plate and configured to direct a first portion of the second light provided by second light source to exit through the lower surface of the light guide plate.

2. The backlight unit of claim 1, wherein the first output pattern comprises a plurality of linear structures configured to allow the first light provided from the first light source and totally reflected internally in the light guide plate to be output through the upper surface of the light guide plate.

3. The backlight unit of claim 2, wherein each of the linear structures has an inverse trapezoid shaped cross section.

4. The backlight unit of claim 1, wherein an upper surface of the first output pattern is fixed to the display panel using an optical adhesive such that a predetermined interval between the first output pattern and the display panel is maintained.

5. The backlight unit of claim 1, wherein the second output pattern comprises a plurality of linear structures configured to allow the second light provided from the second light source and totally reflected internally in the light guide plate to be output through the lower surface of the light guide plate.

6. The backlight unit of claim 5, wherein each of the linear structures has at least a circularly shaped cross section or a polygon shaped cross section, and the linear structures protrude from the light guide plate or are indented into the light guide plate.

7. The backlight unit of claim 1, further comprising:
    a reflector configured to reflect the first portion of the second light output through the lower surface of the light guide plate to the display panel back through the second output pattern.

8. The backlight unit of claim 7, wherein an upper surface of the reflector is in a triangle form.

9. The backlight unit of claim 7, further comprising:
    a diffuser disposed between the second output pattern and the reflector.

10. The backlight unit of claim 1, wherein the first light source is configured to provide the first light for the 3D display to the light guide plate in a first direction and the second light source is configured to provide the second light for the 2D display to the light guide plate in a second direction.

11. The backlight unit of claim 10, wherein the first direction and the second direction are perpendicularly aligned to each other.

12. The backlight unit of claim 1, wherein the first light source and the second light source are disposed on different side surfaces of the light guide plate that do not face each other.

13. The backlight unit of claim 1, wherein at least one of the first light source and the second light source is disposed on different side surfaces of the light guide plate that face each other.

14. The backlight unit of claim 1, further comprising:
    at least one reflector disposed on different side surfaces of the light guide plate that face at least one of the first light source and the second light source.

15. The backlight unit of claim 1, further comprising:
    at least one light guide bar (LGB) and at least one diffuser disposed between the light guide plate and at least one of the first light source or the second light source.

16. A display device comprising:
    a display panel configured to display in a two-dimensional (2D) mode or a three-dimensional (3D) mode;
    a light guide plate configured to provide light to the display panel;
    a first light source configured to provide first light in a first direction to the light guide plate in response to the display panel displaying in the 3D mode; and
    a second light source configured to provide second light in a second direction to the light guide plate in response to the display panel displaying in the 2D mode,
    wherein the light guide plate comprises a first output pattern configured to direct a first portion of the first light provided by the first light source to exit through an upper surface of the light guide plate towards the display panel, and a second output pattern configured to direct a first portion of the second light provided by second light source to exit through the lower surface of the light guide plate, the first output pattern being disposed on the upper surface of the light guide plate and the second output pattern being disposed on the lower surface of the light guide plate.

17. The display device of claim 16, wherein the first output pattern comprises a plurality of linear structures configured to allow the first light provided from the first light source and totally reflected internally in the light guide plate to be output through the upper surface of the light guide plate.

18. The display device of claim 16, wherein the second output pattern comprises a plurality of linear structures configured to allow the second light provided from the second light source and totally reflected internally in the light guide plate to be output through the lower surface of the light guide plate.

19. The display device of claim 16, further comprising:
    a reflector configured to reflect the first portion of the second light output through the lower surface of the light guide plate to the display panel back through the second output pattern to the display panel.

20. The display device of claim 16, wherein the first direction and the second direction are perpendicularly aligned to each other.

21. The display device of claim 16, wherein the first light source and the second light source are disposed on different side surfaces of the light guide plate that do not face each other.

22. The display device of claim 16, further comprising:
    at least one light guide bar (LGB) and at least one diffuser disposed between the light guide plate and at least one of the first light source or the second light source.

23. A light guide plate comprising:
a first linear pattern disposed on a first surface of the light guide plate in a first direction; and
a second linear pattern disposed on a second surface of the light guide plate opposite the first surface in a second direction differing from the first direction,
wherein a first portion of first light from a first light source for a three-dimensional (3D) display is directed by the first linear pattern to exit through the first surface and a first portion of second light from a second light source for a two-dimensional (2D) display is directed by the second linear pattern to exit through the second surface of the light guide plate.

24. The light guide plate of claim 23, wherein the first direction and the second direction are perpendicularly aligned to each other.

25. The light guide plate of claim 23, wherein the first direction and the second direction form an angle greater than 70° and less than 80°.

26. The light guide plate of claim 23, wherein an angle formed by the first direction and the second direction is determined based on a first constraint associated with quality of light for a 3D image and a second constraint associated with quality of light for a 2D image.

27. The light guide plate of claim 23, wherein a cross section of the first linear pattern is an inverse trapezoid shape.

28. The light guide plate of claim 23, wherein a cross section of the second linear pattern is at least a partially circular shape.

29. The light guide plate of claim 23, wherein the first linear pattern comprises a regular pattern and the second linear pattern comprises the regular pattern or an irregular pattern.

30. A light guide plate comprising:
a lower portion comprising a plurality of first structures formed on a lower surface of the lower portion; and
an upper portion comprising a plurality of second structures formed on an upper surface of the upper portion, the plurality of second structures configured to allow a portion of first light from a first light source to exit the light guide plate through the upper surface, and a cross section of at least one of the plurality of second structures having an inverted trapezoid form,
wherein the plurality of first structures are configured to direct a portion of second light from a second light source to exit the light guide plate through the lower surface.

31. The light guide plate according to claim 30, wherein the plurality of first structures are at least one of protrusions or indentations.

32. The light guide plate according to claim 30, wherein the plurality of second structures are formed at uniform intervals.

33. The light guide plate according to claim 30, wherein a cross section of at least one of the plurality of first structures has at least a partially circular form.

34. The light guide plate according to claim 30, wherein the upper portion outputs directional light to a display panel in response to the light being provided from a three-dimensional (3D) light source.

35. The light guide plate according to claim 30, wherein the lower portion outputs uniform light to a display panel in response to the light being provided from a two-dimensional (2D) light source.

* * * * *